March 17, 1953     J. RABINOW     2,632,040
AUTOMATIC HEADLIGHT DIMMER
Filed May 1, 1952
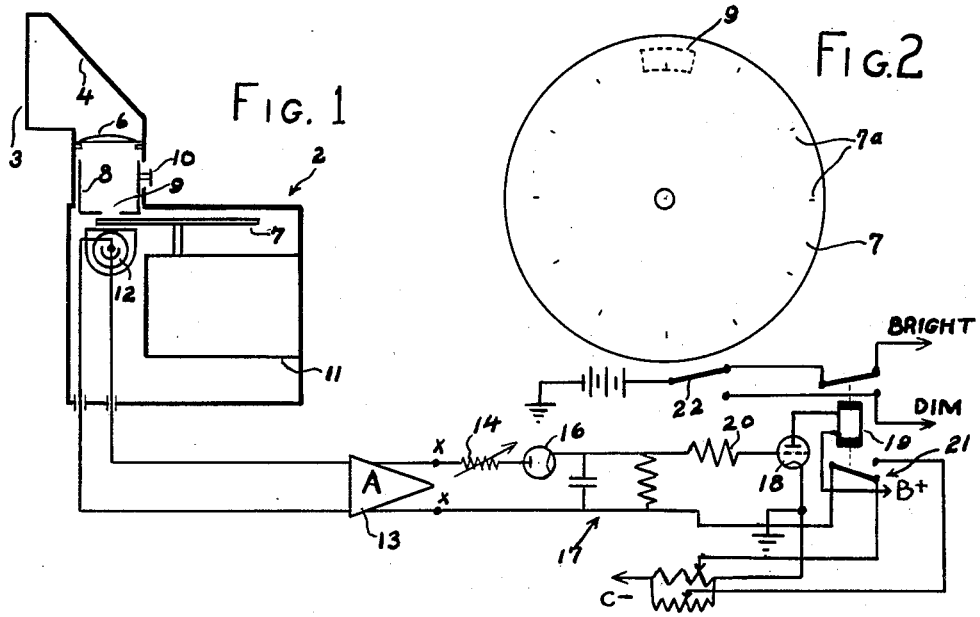
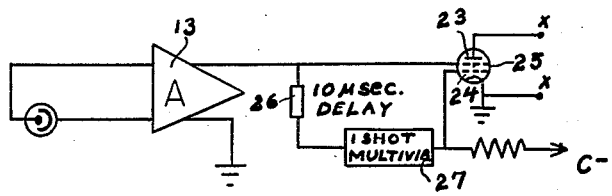
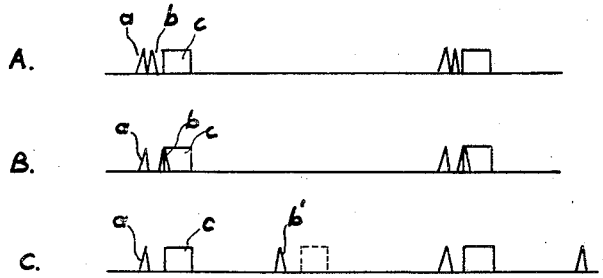
J. RABINOW    INVENTOR
BY Max L. Libman
ATTORNEY Patented Mar. 17, 1953

2,632,040

UNITED STATES PATENT OFFICE 2,632,040

AUTOMATIC HEADLIGHT DIMMER

Jacob Rabinow, Takoma Park, Md.

Application May 1, 1952, Serial No. 285,581

9 Claims. (Cl. 175—321)

This invention relates to automatic headlight dimmers, and has for its principal object the provision of an improved dimmer which causes automatic dimming of the headlights of a vehicle upon detection of a predetermined degree of contrast between the background of the driver's effective field of view and localized spots of intense light such as are produced by the headlights of an oncoming vehicle.

Automatic headlight dimmers have long been known which cause dimming when the light from the headlights of an oncoming car falls upon a photocell or other light-sensitive device. All such devices of which I am aware are responsive to the total received light flux; that is to say, the photocell actuates a relay to cause dimming when the received light reaches a certain intensity. This causes uncertain operation under many common conditions of operation; e. g., at dusk, when the lights are first turned on, the background illumination may be sufficiently intense, due to the sky light, to cause dimming even though the light on the road is not sufficient for safe driving. Furthermore, most of the prior art devices produce a direct-current output from the photoelectric device, which requires either a modulating device or direct-current amplification, which is more complex and expensive than alternating-current amplification. My system inherently produces pulses which can be simply and inexpensively amplified and detected. Such prior art devices are also not sensitive to the factors which produce glare in that they respond to the total field of illumination, yet if the field is bright but uniform, as occurs in a brightly lighted area or during early dusk, this field will not produce glare (e. g. daylight is brightest of all, yet is not uncomfortable to the driver), yet it will activate the relay in prior art systems.

It is a further object of my invention to produce a system which has the maximum sensitivity in that it responds in accordance with the factor which is chiefly responsible for the driver's discomfort and loss of vision because of glare. This factor is in contrast between the oncoming headlights and the general background. For example, even bright headlights are hardly discernible during daylight. It is only against a relatively dark background that they are objectionable. My system responds primarily to the contrast between the brightness of the oncoming headlights and the general background, and therefore to the very factor which causes the oncoming lights to be objectionable. Because this contrast is very great (even the contrast between the dimmed lights of an oncoming vehicle and any other point of ordinary illumination, such as illuminated signs, is very marked and easy to detect), my system can be made more sensitive than prior art systems and can be made to have characteristics very closely related to the discomfort factor of oncoming headlights, thus providing for the first time a truly correct solution to this problem.

My invention contemplates scanning of that portion of the field of view of the driver that is covered by his "bright" headlights, producing indications which are in accordance with the illumination received from discrete small portions of said field, said discrete portions being continuously compared with the rest of the field, and dimming actuation being produced in accordance with the results of this comparison.

Another object of my invention is to provide a dimmer which automatically senses the approximate distance of the oncoming vehicle and operates the headlight dimmer at a predetermined distance from the oncoming vehicle, thus providing an additional factor of control which may be useful in some circumstances.

Further objects and advantages will be apparent from the following description and the appended drawings in which:

Fig. 1 is a schematic diagram and circuit drawing of a system embodying my invention;

Fig. 2 is a view of the scanning disc showing the relationship between the light apertures and the masking element;

Fig. 3 is a circuit diagram of an alternative form of my invention; and

Fig. 4 shows the time relationship of pulses under different conditions in the circuit of Fig. 3.

Referring to Fig. 1, the optical part of the system is contained in the housing 2, the general dimensions being in the order of 4 x 4 x 6 inches. Light enters at 3, is reflected by mirror 4 through lens 6 and focused upon scanning disc 7 through masking member 8, which masks the observed field down to a rectangular area as indicated at 9 in Fig. 2, this representing the desired field of view. This field of view would generally correspond to the field of illumination produced by the bright headlights of the vehicle on which this device is mounted. The scanning disc is continually rotated by means of motor 11 at a suitable speed, which may, for example, be 30 R. P. S. Suitable small motors for this purpose are commercially available and draw a negligible amount of current in the small size necessary for the purpose of rotating a light two-inch disc, or pneumatic motor powered by the automobile engine may be used. The motor may be so connected in the headlight switch circuit that it runs continually when the headlights are on, or it may be controlled by the manual overriding switch described below so that it is cut out when the headlights are under manual or foot control and the automatic dimmer is not in operation.

The scanning disc is provided with a spiral row of apertures as shown in Fig. 2, somewhat like the Nipkow scanning disc originally used in early television. I prefer to have only one aperture in the field at one time so that light will be received by the photocell 12 from only one discrete area at a time. With the relation between the unmasked area and disc as shown in the drawing, I provide twelve apertures in the disc so that one aperture will enter the field of view just as the previous one is leaving. It will be apparent that if a larger disc is used with the same sized masking aperture 9, more holes could be put into the scanning disc, which means that the vertical height of the holes could be decreased. The holes in the disc could be of any suitable size, but I prefer to make them of a width corresponding in magnitude to the width of a typical single headlight seen at a distance of 500 feet. Using, for a typical example, a lens of one inch focus and masking the area down to the size shown, and assuming the diameter of a typical headlight to be approximately a foot, it is apparent that the image of the headlight on the scanning disc in the focal plane will be in the order of 0.002 inch. I therefore make this the width of the aperture. This is the narrowest aperture that will admit all of the light of the headlight at 500 feet. A wider aperture is not needed and will only admit more of the background light and so tend to reduce the contrast where the background level of illumination is quite high. Since with the size of disc shown there can be no more than 12 apertures due to the limitation that only one aperture is to be in the field of view at one time, the height of the apertures must be $\frac{1}{12}$ of the height of the masking aperture. Therefore the height in the example given will be approximately 0.02 inch. At smaller distances than 500 feet, the intensity of the oncoming headlights is so much greater than at 500 feet that even though the full light of the oncoming headlight is not admitted at one time by the small aperture, the contrast will be greater than at the longer distance and the system will still work. Furthermore, it will be apparent as the description proceeds that my invention operates not as a function of the total amount of light received from an oncoming headlight, as long as this is above the necessary minimum, but as a function of the ratio of illumination of the discrete area which is being investigated at any one time to the background.

Any light which passes through the apertures in the scanning disc falls upon the photocell, or other suitable light-sensitive device 12. Since the scanning disc rotates in a typical case at 30 R. P. S., the electrical output pattern of the cell will be repeated at this rate, and can therefore be amplified directly without further modulation. A suitable circuit arrangement for this purpose is shown in Fig. 1.

It will be noted that the masking aperture can be moved toward and away from the lens 6 by means of adjusting member 10. This aperture is preferably moved into a position sufficiently out of the focal plane of the lens 6 so that the image of the edges of the aperture is not sharp, but is "fuzzy." In this way, any light from the small apertures 7a of the scanning disc appears on the image gradually rather than suddenly and similarly fades out at the opposite edge of the masking aperture. Since the spacing of adjacent slits 7a is made exactly equal to the width of the masking aperture, this means that the light from one slit 7a fades in as the light from the next slit fades out so that the average intensity of illumination from a constant background remains constant and sudden transients are not produced by the appearance and disappearance of the slits from the area representing the field of vision. The same effect could, of course, be produced by other means, for example, by a "gray area" at the edges of the masking aperture of increasing opacity from the aperture toward the edges, but the defocusing means shown is simpler and permits a certain amount of control of the edge fading.

The apertures 7a may be actual perforations if the disc 7 is made of opaque material, or the disc may be of transparent material with a printed or photographed coating having optical apertures in the form of transparent portions.

The output of the photocell is first amplified by conventional means, indicated at 13, and then is passed through a variable resistance 14 to a rectifier 16. If desired the amplifier can be made to pass only the sharp peaks and not respond appreciably to low frequencies. The rectified output is passed through a network 17, comprising a peak detector of conventional arrangement, the constants of which are selected so that the variations in received intensity corresponding to the variations in light intensity of the ordinary field of view (when there is no headlight of an oncoming vehicle therein) will not produce sufficient output at the grid of amplifier tube 18 to energize the relay 19. The light of an oncoming headlight is so much more intense than this background that there is easily sufficient difference between the two so that the relay 19 can be made to operate on the large peaks produced by even the dimmed headlights of an oncoming car, but not on the small peaks produced by any other light which would normally come into the field of view. Even at dusk, when there is still a large amount of total light in the sky, by the time it becomes necessary to turn on the headlights, the sky light from an area as small as the one being scanned is still much less intense than that received from oncoming headlights, so that there is an ample margin of difference on which to operate.

Relay 19 controls the operation of the headlight dimming circuit as shown, the switch 21 being normally biased to "bright" position, but made to dim whenever the relay is actuated. I show in addition a manual, or more typically, a foot-controlled switch 22, arranged to override the operation of the automatic switch so that in any unusual situation the operator still has the usual control of the headlights. For example, in some cities it is required to drive with dimmed lights within the city, and other situations may arise where the operator wishes to dim the lights even when there is no oncoming vehicle.

Relay 19 is preferably of the type which requires less current to hold than to initially energize it, which is normally the case in any event. This characteristic is desirable to prevent oscillation or flickering of the headlights in the situation where the photocell is actuated by an oncoming light at the extreme distance or by the weakest oncoming light to which it will respond. In that case, if the oncoming car's lights are also dimmed (whether by a similar automatic system or manually) then the light from the oncoming car would now be below the minimum intensity to which the system would respond, and the relay would release, causing the lights to return to bright. If both cars are equipped with automatic systems, a condition of oscillation or flickering might be set up which would be highly disagreeable. By making the relay one which requires less current to hold than to initially operate, this possibility is prevented. It is obvious that this result can be accomplished in other ways and one such way is shown in Fig. 1; for example, the relay 19 may be provided with another set of contacts 21 arranged so that on operation of the relay the sensitivity of the amplifier is increased (as by changing the grid bias of the control tube), so that even if the oncoming headlights are dimmed, the relay will not let go.

In Fig. 1, the function of resistance 14 is to provide a small delay, which can be controlled, in the time the headlights are dimmed so as to retard the time of initiation of dimming. This is to insure that at the extreme range of operation of two cars equipped with my invention each one will have time to be affected by the headlights of the other before the dimming action takes place, otherwise the more sensitive one would be dimmed considerably before the other one. The resistance is made adjustable so that this delay can be adjusted to suit the circumstances of operation as required. Resistance 20 is to prevent grid current in cases of very large signals.

The manual overriding feature is shown at 22 in Fig. 1 and consists of a manual or foot switch inserted as shown. In the upper position of the switch as shown in the figure, the headlights are under control of the automatic system, but when the switch is moved into the lower position, the lights will be dimmed regardless of the position of the relay switch.

Fig. 3 shows another modification of my invention for withholding actuation of the automatic dimmer until the oncoming car has approached within a predetermined distance. This is done by taking advantage of the resolving power of the small apertures of the scanning disc. At a great distance, the separation between two headlights of an oncoming car is not sufficient for resolution of the two headlights, so that they appear as one light source. Under these conditions, the light from the two headlamps passes through a single aperture 7a of the scanning disc 7, producing a single pulse for each revolution of the disc. As the distance decreases, the image of each headlight increases on the disc until the diameter of each headlight is of the same order as the width of the aperture. At some point before this happens, there has been a substantial revolution of the images of the two headlamps so that each one of them produces a pulse as it is scanned by the aperture. The distance between these two pulses will at first be very close, and will increase as the distance between the two cars decreases. Correspondingly, the time between these two pulses as they appear in the electrical circuit will also increase. This time interval is also a measure of the distance of the car bearing the two headlamps. When the interval is very small, the opposite car is very far away, and even though its headlights may be discernible, it is not necessary, or perhaps legally required, to dim your own lights. With the dimensions given in connection with the preceding figures, and assuming a headlight spacing in the order of five feet, then at a distance of more than 500 feet at a disc rate of 30 R. P. S. as before, the headlamps of an oncoming car will produce two pulses or pips, $a$, $b$, in Fig. 4A, which will be less than 10 microseconds apart. These are fed into the circuit of Fig. 3 which is very similar to the circuit of Fig. 1, but, has in addition thereto the tube 25 with two grids arranged to function as a coincidence tube; that is, both grids must be energized in order to pass a signal. One of these grids 23 is connected directly to the output of amplifier 13 as before. The other grid 24 of tube 25 is connected to the same output through a 10 microsecond delay line 26 and a multivibrator 27 connected as a one-shot multivibrator in known fashion, so that when it is pulsed the second grid of tube 25 will be energized for a definite time interval which is the natural period of the multivibrator. This time interval in the example given would be considerably less than $\frac{1}{30}$ of a second, or the revolution period of the disc. The action is as follows: a pulse transmitted through the amplifier 13 appears on the first grid 23 of tube 25. Ten microseconds later, the same pulse also actuates the second grid 24, due to the action of the multivibrator, this grid remaining actuated for a fairly long time, for example 100 microseconds. No pulse is passed by tube 25 due to this single pulse from amplifier 13, because the energization of the first grid has disappeared before the second grid became energized, due to the action of the delay line. However, if a second pulse comes out of the amplifier after the ten microsecond interval (but within 100 microseconds) then it will find the second grid of tube 25 energized. Under these conditions a pulse will be passed for each revolution of the disc, and the relay will be energized. Successive single pulses from a single light source of a car more than 500 feet away will not be passed because the "on" period of the multivibrator is less than the rotational period of the disc. In this manner the operation of the dimmer relay 19 can be set for any predetermined distance. On the other hand, this arrangement has the disadvantage that a single headlight, as from a motorcycle, will not cause automatic dimming, while under some conditions the light from two very distant cars may cause automatic dimming if they are spaced at the same angle as the individual headlights of a car at the predetermined closer distance.

Figure 4 shows graphically the relation of the above-described pulses. Pulse $a$ is produced by the first headlight of the oncoming car, and pulse $b$ is produced by the second headlight. In Fig. 4A the two headlights are so far apart that the pulses $a$, $b$, appear closer together in time than ten microseconds and so the second pulse $b$ disappears from grid 23 before the square pulse output $c$ of the multivibrator appears on grid 24; therefore pulse $b$ is not passed by control tube 25. For the same reason, of course, pulse $a$ cannot be passed by tube 25. Pulse $b$ can have no effect on the duration of the multivibrator output until the multivibrator resumes its original state. As the oncoming car approaches, the interval between the two pulses increases, until the condition of Fig. 4B occurs, wherein pulse b and the multivibrator pulse c coincide in time, whereupon pulse b is passed by control tube 25, and the action becomes the same as described in connection with Fig. 1. If a second pulse b' from another light source is received after termination of the multivibrator pulse c, as shown in Fig. 4C, it will have no effect. The likelihood of unnecessary dimming is thereby reduced, being restricted to the case where the second source of light is spaced from the first by a distance corresponding to a particular angle corresponding to the preset ten microsecond delay, and since this second source must also be of a definite intensity, it will be seen that the incidence of false dimmings can be held to a tolerable minimum for most driving conditions. If desired, a manual control switch can be provided to cut out the distance-responsive part of the circuit shown in Fig. 3, so that the operation of either Fig. 1 or Fig. 3 can be selected at will.

Although the optical part of the system may be put in any desired location, I prefer to put it behind the windshield where it will be protected from the dirt and mud of traffic and also from the weather. By placing it behind that portion of the windshield which is cleaned by the windshield wiper, it will be effective under all weather conditions. The housing 2 can be so designed that it will fit behind the dash of modern cars, and a single hole in the top of the dash will suffice to mount the optical system, with only the light-gathering element 3 protruding above the dash. Since the major dimension of this element can easily be made less than 2 inches, it can readily be placed so as not to interfere with the driver's vision.

It will be apparent that the embodiments shown are only exemplary and that various modifications can be made in construction and arrangement within the scope of my invention as defined in the appended claims.

I claim:

1. An automatic headlight dimmer comprising an optical system for producing an image of a desired portion of the field of vision, means for scanning said image, light-responsive means for converting the light from the scanned portion of said image into an electrical output, and a headlight-dimming circuit controlled by said electrical output.

2. An automatic headlight dimmer comprising an optical system for producing an image of a selected portion of the driver's field of vision, observing different means for continuously scanning discrete small areas of said image, photoelectric means actuated by the observed portion of said image, an electric circuit controlled by said photoelectric means, and a headlight dimmer controlled by said electric circuit.

3. An automatic headlight dimmer comprising a lens system oriented to produce an image of the driver's field of vision, an adjustable masking device for masking out all but a selected portion of said image, means for adjusting said masking device along the optical axis of the lens system, a scanning disc having a series of optical apertures for scanning the selected portion of said image, a photoelectric device positioned to receive light passed by said scanning disc from said image, a peak detector responsive to the output of said photoelectric device, and a headlight dimming circuit controlled by the output of said peak detector.

4. The invention defined in the preceding claim wherein said dimming circuit includes means responsive to the output of said peak detector for energizing the headlight dimming circuit in response to pulses of a predetermined magnitude, and an additional circuit controlled by said responsive means for increasing the sensitivity of the system upon energization of the dimming circuit.

5. The invention defined in claim 3, including an amplifier for the output of said photoelectric device, a coincidence tube having two grids, one of which is connected directly to said amplifier, a delay line also connected to the output of said amplifier, a pulse-broadening device connected to said delay line, and a connection between said last device and the second grid of said coincidence tube.

6. An automatic headlight dimmer including means for scanning a selected field of view, photoelectric means for producing a series of electric pulses in response to the scanning of a bright light source in said field of view, and headlight dimming means responsive to a predetermined intensity of said pulses.

7. The invention defined in the preceding claim, including means responsive to the time interval between successive pulses for controlling the transmission of said pulses to said headlight dimming means.

8. An automatic headlight dimmer comprising means for producing an image of a selected field of vision, means responsive to the differential illumination of respective discrete areas of said image to produce an electrical output which is a function of said differential illumination, and headlight dimming means controlled by said electrical output.

9. An automatic headlight dimmer comprising an optical system including means for examining individually small elemental areas of a selected portion of the driver's field of view, means responsive to light emitted by said elemental areas to produce an electrical output, electric circuit means for comparing the outputs due to the respective elemental areas to produce a signal output related to the differences in light emitted by the respective elemental areas, and a headlight dimmer controlled by the output of said electric circuit means.

JACOB RABINOW.

REFERENCES CITED

The following references are of record in the file of this patent:

UNITED STATES PATENTS

| Number | Name | Date |
|---|---|---|
| 2,423,278 | Willis, Jr. | July 1, 1947 |